United States Patent

[11] 3,619,546

| [72] | Inventor | Sidney Briggs, III<br>Bay City, Mich. |
|---|---|---|
| [21] | Appl. No. | 823,716 |
| [22] | Filed | May 12, 1969 |
| [45] | Patented | Nov. 9, 1971 |
| [73] | Assignee | Amtel Inc.<br>Providence, R.I. |

[54] LONGITUDINAL STRIP EDGE BUTT WELDING
25 Claims, 14 Drawing Figs.

[52] U.S. Cl. .................................... 219/102, 219/59, 219/67
[51] Int. Cl. .................................... B23k 11/04
[50] Field of Search .................... 219/101–107, 67, 117, 52, 59, 60, 64

[56] References Cited
UNITED STATES PATENTS

| 2,647,981 | 8/1953 | Wogerbauer | 219/59 |
| 2,922,020 | 1/1960 | Andrew | 219/59 X |
| 3,319,040 | 5/1967 | Rudd | 219/107 X |
| 3,325,623 | 6/1967 | Briggs | 219/102 |
| 3,420,976 | 1/1969 | Morris et al. | 219/102 |

Primary Examiner—J. V. Truhe
Assistant Examiner—L. A. Schutzman
Attorney—Whittemore, Hulbert and Belknap ABSTRACT: A pair of wide, elongated strips to be butt welded together pass convergently into a weld zone, as partially wrapped about large diameter rubber covered rolls, thus placing the converging strips in an arcuate cross section in reaching the apex of the weld zone, rather than approaching it in convergent flat planes. Transverse deflection of the strips normal to their planes, tending to cause their edges to snap past one another to an excessive overlap, is eliminated. The strips are heated to welding temperature by either sliding contact electrodes or inductive heating means. Each strip edge laterally overhangs slightly an edge of its large diameter wrapping roll.

INVENTOR.
SIDNEY BRIGGS, III

PATENTED NOV 9 1971
3,619,546
SHEET 2 OF 4
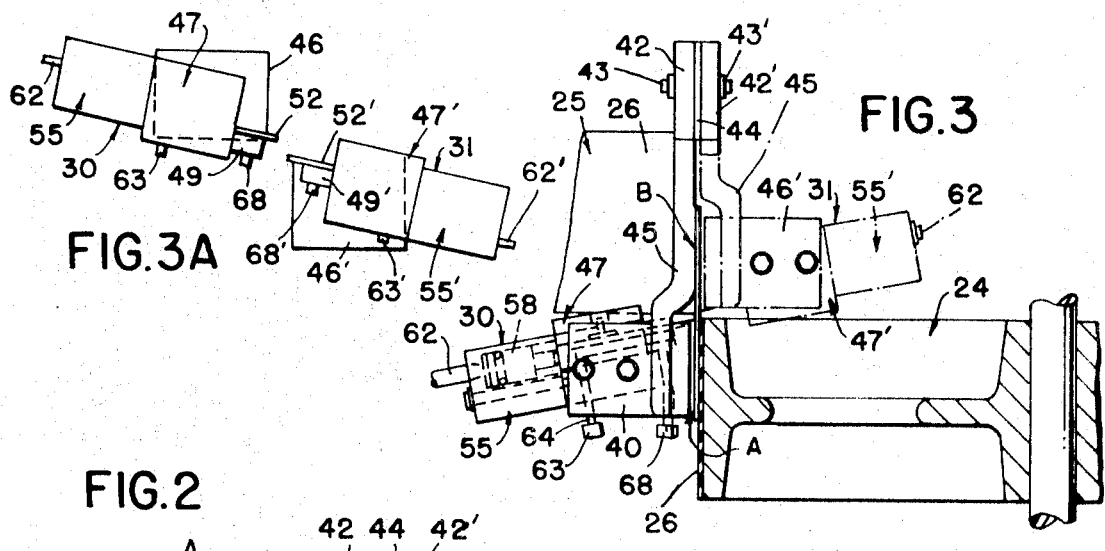
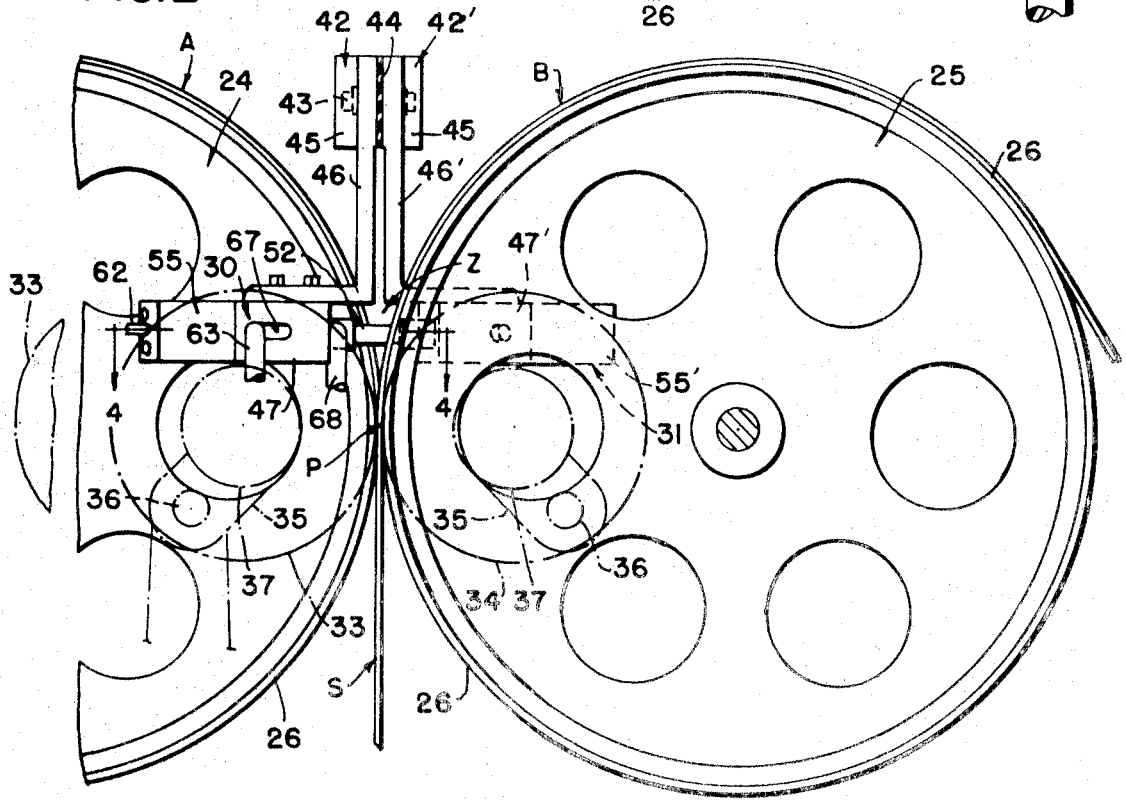
INVENTOR.
SIDNEY BRIGGS, III
BY
ATTORNEYS

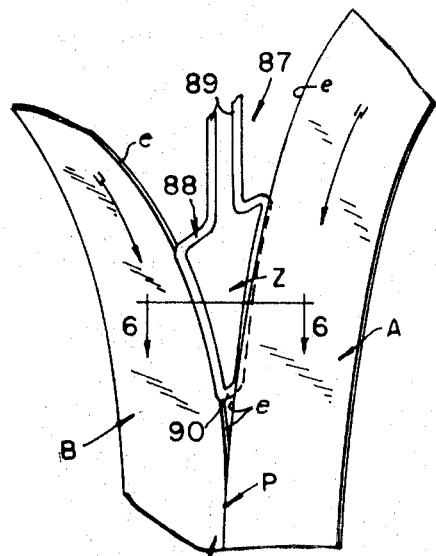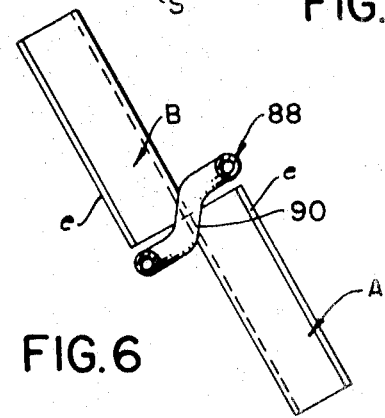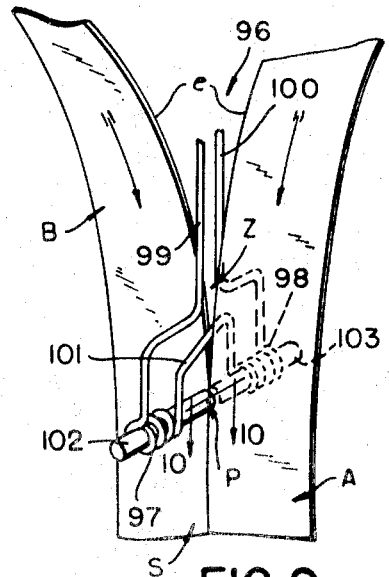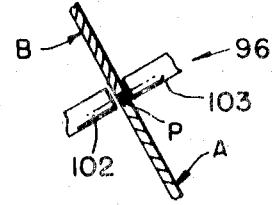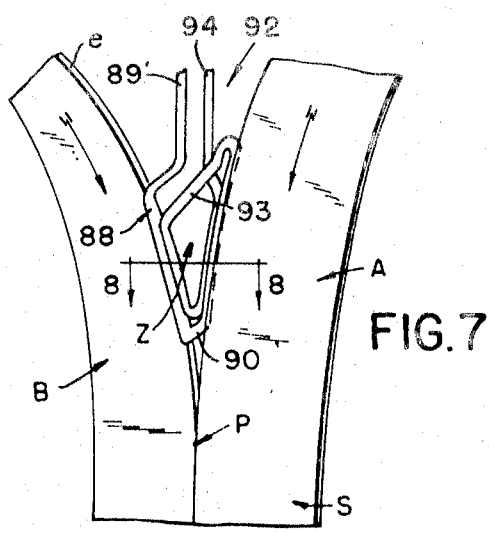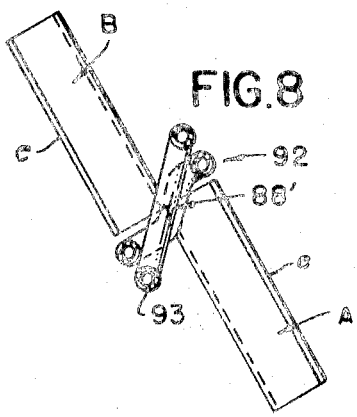

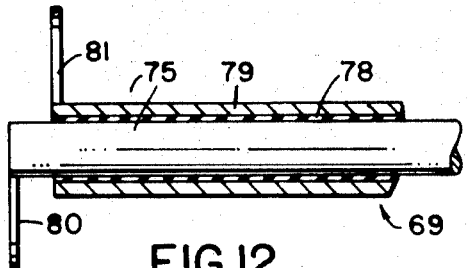
FIG.12
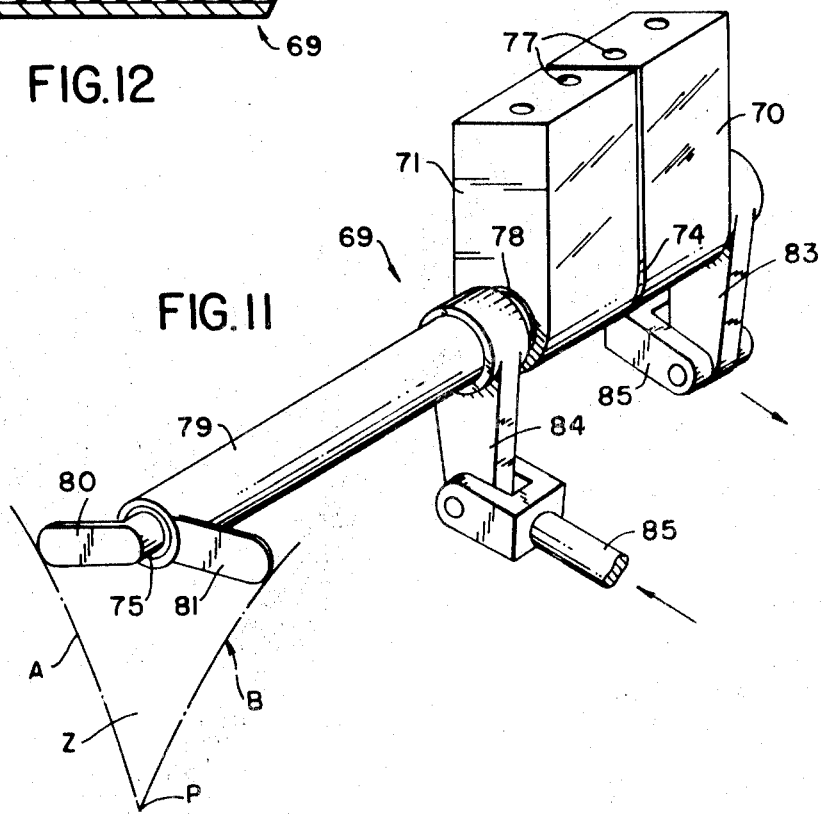
FIG.11
FIG.13
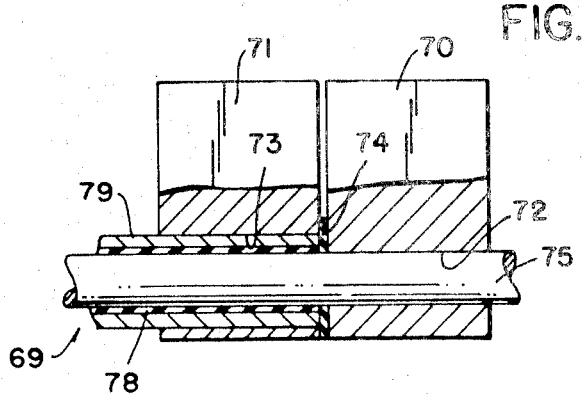
INVENTOR.
SIDNEY BRIGGS, III
ATTORNEYS

LONGITUDINAL STRIP EDGE BUTT WELDING

CROSS-REFERENCE TO RELATED APPLICATIONS

My copending application of common ownership, Ser. No. 634,924, filed May 1, 1967, now U.S. Pat. No. 3,517,158, issued June 23, 1970 illustrates and describes continuous edge-butt welding equipment of the same general type as that herein illustrated and described. My copending application, Ser. No. 792,043, filed Jan. 17, 1969, relates to equipment of this sort as associated in combination with weld inspection equipment.

BACKGROUND OF THE INVENTION

1. Field of the Invention

The method and apparatus of invention find application in the field of high-frequency resistance or some other type welding of rapidly advancing thin metal strips and, as mentioned in the applications identified above, in particular in special type edge-butt welding operations. However, in respect to its disclosures of special sliding contact electrode or induction-type heating means the present disclosure also relates to the welding together of traveling edges other than flat strip edges.

2. Description of the Prior Art

The most pertinent prior art patent of which I am aware is my own U.S. Pat. No. 3,325,623 of June 13, 1967, which shows and describes equipment and a method or procedure for the edge-butt welding of traveling strips approaching convergently and passing through a weld zone, in which the butt weld is accomplished by causing the heated convergent edges, as very slightly overlapped relative to one another, to wipe across one another, so that a true butt weld, and not a lap weld, is produced as the strips go into the common plane of the welded product.

Wogerbauer, U.S. Pat. No. 2,647,981 of Aug. 4, 1953, deals with the application of side pressure along the plane of edges to be joined, but the effect does not involve the edge wiping action mentioned above, nor is there any teaching of wrapping converging strip edges into arcuate outlines in approaching a weld zone to avoid undue overlap under flexure.

SUMMARY OF THE INVENTION

During the process of welding metal strips in the manner described in my patent identified above a problem arises when working with strips of a relatively wide, thin nature, inherently lacking sufficient rigidity to withstand the lateral inward pressure generated as the strips pass between confining edge guide rollers of the sort shown in the patent, or even under inherent and unassisted edge pressure toward one another as the strips go into and through the weld zone. As a result, one or both strips deflect in a direction normal to the plane thereof, resulting in their snapping unduly past one another in the lateral sense, and a poor control of the width of ultimate welded strip product. The present invention improves the apparatus and method of my patent, as well as my copending applications identified above, in that it enables the welding of considerably wider strips than heretofore practical, as will appear.

In accordance with the improved concept the strips are brought convergently into welding position while wrapped around large diameter rubber covered rolls, rather than converging to the apex of the welding zone in flat planes. The resultant curvature of the strips, preferably in mutually convex outlines, causes added rigidity or column strength to be imparted to them in the lateral direction that the edge pressure had formerly caused distortion, particularly in the case of wider and thinner sizes of strips.

As an example, while most common size strips currently welded are 1.008±0.005 inch wide and 0.018±0.001 inch in thickness, producing a finished strip which is 2.000 inch +0.005 −0.002 wide, the present equipment will accommodate stock up to a combined width of 6 inches and a thickness of approximately 0.040 inch.

In further accordance with the invention, the strips each first pass over a tension bridle which applies a proper amount of drag for the welding operation, in a manner such that precision of tension control is ensured. Furthermore, an idling steering roll is provided for each strip, which roll is on a movable axis to permit steering the strips toward approximate edge alignment at adjacent sides thereof before they wrap onto the previously mentioned large diameter support rolls.

As a final guiding measure, the inner edge of each strip is run along a type of positive stop with micrometer adjustment to put the strip into the desired degree of edge alignment, such stop being shown as an annular flange on an idler guide roll, although other means may prove practical in actual practice. An advantage of guiding by the inner rather than the outer edge is, that the amount of weld upset always remains constant; it is not changed by variations of strip width.

The invention contemplates that the inner edge of each strip shall overhang an edge of the above-mentioned large supporting wraparound roll somewhat to avoid having the heated strip edge in destructive contact with the roll. This also permits the use of opposed pressure applying wheels at or adjacent the weld point as shown in my above-identified patent, if such wheels are found desirable.

Likewise, the large rolls are provided with a means of micrometer adjustment in a direction to increase or decrease shaft centerline distance; thus the faces of the rolls can be adjusted to a separation amounting to the metal thickness being welded, again assuring proper alignment of the strips.

As the strips approach the weld point or apex, they converge at an angle determined by the roll diameter; and at the weld point the heated strip edges wipe past each other, as described in my patent, as they come into parallel, coplanar alignment; and, as indicated above, at this point opposed pressure applying seaming wheels may or may not be used, depending upon conditions. By continuing the wrap around the large diameter rolls for a further distance, the weld is allowed to cool or solidify before a damaging amount of stress is set up.

Alternatives contemplated by the invention are (a) the heating of the strip edges by a high-frequency electrical current applied to each edge through the agency of a sliding contact or electrode, energized through coaxial cable or lead means, or (b) by inductive heating using single or plural turn, electrically energized coil means positioned closely adjacent but spaced from the converging strip edges. In the first case the leads, as supplied, from a power output transformer, may be liquid cooled, which allows the transformer to be remotely located; and, being coaxial, the conductors may be rotated slightly for electrode positioning. Because of the remoted transformer, and the arcuate weld zone apex being formed by the rolls, the electrode area is more accessible than before and more exacting electrode positioning is possible. By preference, the contacting electrodes are narrow copper strips advanced against the strips under constant pneumatic force to compensate for wear, also to allow longer running times without down time for electrode change.

In reference to the second concept involving the use of the induction heating principle through a one or two turn coil, the advantage lies in the fact that a noncontacting means heating the strip edges eliminates electrode wear, strip marking and arcing. The inductive heating may be intensified and focused by means of ferrite rod cores associated with the coils.

In general, the slight curvature of the strip approaching the weld apex affords a structurally stable condition, thermal expansion of the heated edge being constantly in a uniform direction, thus to reduce undesirable gyrations of the strip edge. Obviously the elimination of edge guide rolls is an advantage; with sufficient tension applied on the strips, they will be tightly pressed against the roll surface and resist edgewise movement while being wiped together. The curvature of the strips also resists edgewise bending.

BRIEF DESCRIPTION OF THE DRAWINGS

FIG. 2 is a fragmentary view in side elevation showing somewhat more clearly than FIG. 1 the arrangement of electrode units and large diameter wraparound rolls, about which the arcuately converging strips pass into and through the weld zone apex, optionally usable seaming rollers being shown in dot-dash line;

FIG. 3 is a fragmentary view in section on broken line 3—3 of FIG. 1, further illustrating the relationship of electrode units and their mounting means to the large diameter rolls, one of the electrode units being shown in dot-dash line;

FIG. 3A is a fragmentary view showing the water-cooled, pneumatically urged electrode units alone;

FIG. 4 is an enlarged scale fragmentary view in section on line 4—4 of FIG. 2, showing internal details of such an electrode unit;

FIG. 5 is a fragmentary view in perspective, being of a somewhat schematic nature, illustrating a detail of the embodiment of the invention in which inductive heating of the strip edges is employed, in this case using a single-coil or turn heater;

FIG. 6 is an enlarged scale view in section on line 6—6 of FIG. 5;

FIG. 7 is a view similar to FIG. 5, but showing the use of a two-turn heating coil;

FIG. 8 is a view section on line 8—8 of FIG. 7;

FIG. 9 is a still further alternative embodiment of the inductive heating principle, utilizing a multiple turn coil, the windings of which encircle concentrating core elements;

FIG. 10 is a fragmentary view in section on line 10—10 of FIG. 9;

FIG. 11 is a perspective view schematically showing an alternative, coaxial conductor-supplied version of sliding contact-type resistance heating units;

FIG. 12 is a view in diametral section through portions of such units at the contactor end thereof; and FIG. 13 is a view similar to FIG. 12, but at the power input zone of the units.

DESCRIPTION OF PREFERRED EMBODIMENTS

Figure 1:
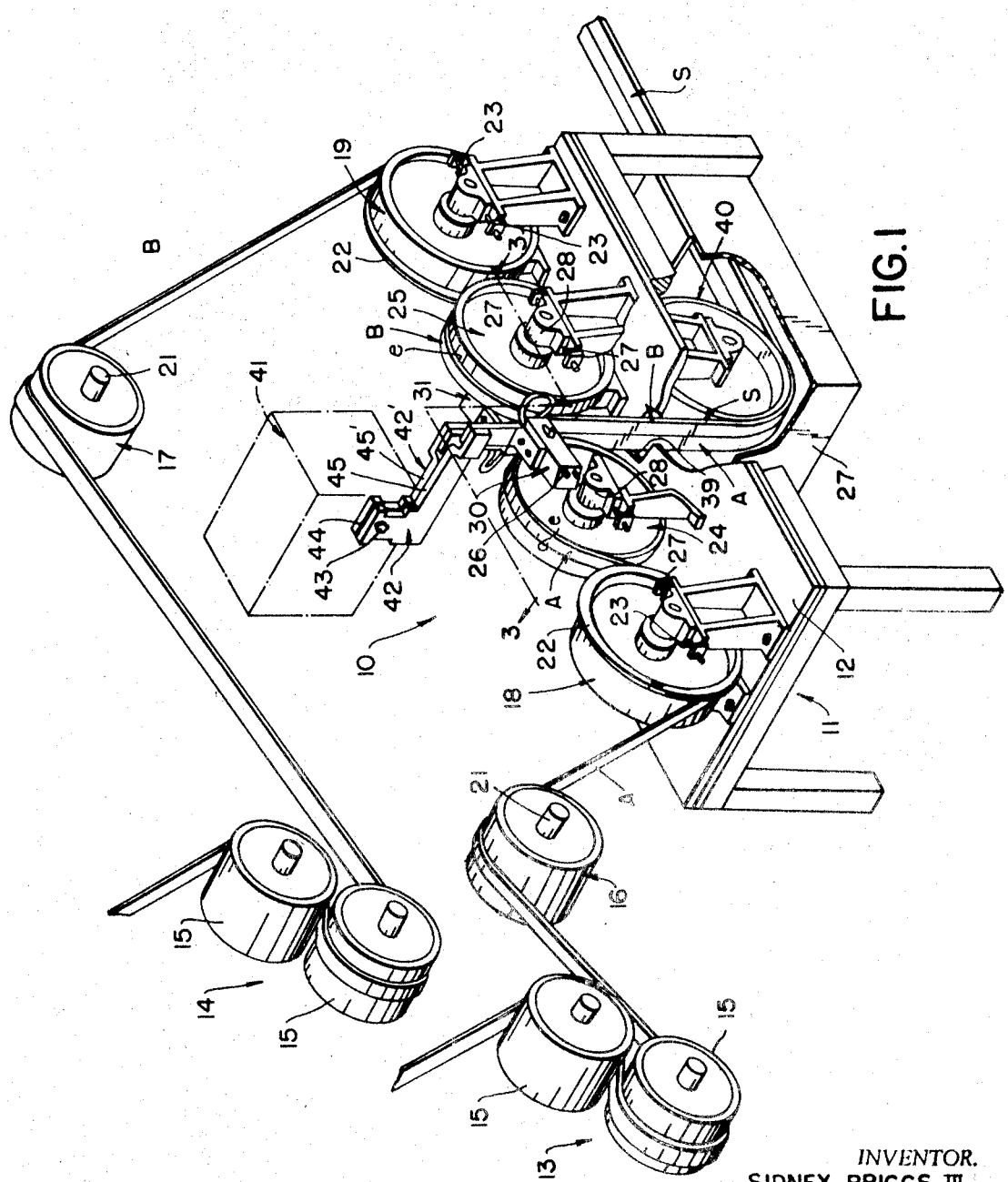
FIG. 1 is a fragmentary perspective view, partially broken away, showing the improved welding equipment of the invention in a sliding contact-type resistance electrode embodiment, a remotely located power transformer component being indicated in dot-dash line.

FIG. 1 best illustrates in a general way the improved equipment of the invention. A welding assembly or module, generally designated by the reference numeral 10, includes a number of roll components, hereinafter described, fixedly mounted upon a sturdy base or framework 11 presenting a flat horizontal upper surface 12 onto which the components in question are fixedly bolted. Strips A and B of flexible metal stock to be welded, for example, of stainless and galvanized steel stock, respectively, aggregating in width up to the approximate 6 inches mentioned above, are tension drawn from reels (not shown) through the respective tension bridles 13, 14, each comprising a pair of laterally spaced, parallel shaft-mounted rolls 15 of substantial diameter and length, then about the respective steering rolls 16, 17 and beneath the respective guide rolls 18, 19. The rolls 15 of tension bridles 13, 14 are idlers, but they ensure the existence of a proper degree of tension in strips A and B, as drawn from the supply reels by means (not shown) on the output side of welder module 10 for the proper welding operation This is as contemplated by my patent identified above, in which heated adjacent strip edges are wiped past one another into a fused, coplanar, edge butt welded relationship.

The steering rolls 16, 17 are each mounted on a movable axle or shaft 21 to enable the respective strips 54 and B to be steered into approximate longitudinal and parallel alignment before engaging around guide rollers 18, 19; and the latter are each provided with a radially enlarged circumferential flange 22 at one axial end thereof. As fed onto the guide rolls 18, the adjacent inner edges of strips A, B are engaged in the axial sense against the respective flanges 22 these strip edges ultimately becoming the intermediate seam of the welded strip product S. Thus the flanges 22 constitute positive edge stops in the axial sense by which, with the assistance of micrometer-type threaded adjustment means 23, each strip may be placed in its exactly intended axial relationship to the other strip to ensure a uniformly constant extent of slight lateral overlap of strips A and B as they enter and pass through the convergent welding zone.

Passing beneath guide rollers 18, 19, the strips A and B are trained upwardly in approaching relation to one another over the like, large diameter, wide rolls 24, 25, respectively, being wrapped around a substantial percentage of the circumference of these rolls to receive the desired arcuate curvature of the strips A and B in the desired mutually convex convergent relationship to one another, as they enter into the weld zone. This zone is designated Z in FIG. 2, its apex of conversion being at the weld point P on a common diametral line of support rolls 24, 25.

Rolls 24 and 25 are, as best shown in FIGS. 2, 3 and 4, each equipped about the full circumferential area thereof with bonded natural or synthetic rubber friction sheaths or surfaces 26, thus to resist lateral displacement of the strips in their arcuate travel; and it is to be observed in reference to FIG. 4, that the strip edges e slightly overhang the roll edges to avoid damaging contact of the elevated temperature edge zones with the roll sheaths 26.

Threaded micrometer adjustment means 27 engage shiftably mounted journals 28 for the rolls 24, 25 to increase or diminish the shaft centerline distance to accord with thickness of the strip stock being welded.

As strips A and B converge in weld zone Z, welder units 30, 31 of the sliding contact resistance type, in one version or another, act on the respective arcuately converging strips A and B as their adjacent edges e pass beneath the electrodes of the units, to be described; and in reaching and passing the apical weld point at/or closely adjacent a plane including the axes of rolls 24 and 25, the strip edges e are wiped with considerable transverse force past one another, thus to effect the desired edge-butt welded union in a common plane.

If desired, the welded seam at edges e may be rolled by opposed narrow wheels 33, 34 appearing in dot-dash line in FIGS. 2 and 4, as in the case of my patent and my application, Ser. No. 634,924 identified above to which reference may be had. They are located at or closely adjacent apex point P in the arcuate sense; and welder units 30, 31 act on strips A and B at points approximately 12° in advance of the apex, as the strips pass into and through weld zone Z.

Wheels 33, 34 are in the present instance not precisely designated as being pressure wheels, inasmuch as the wiped butt weld S is completed, or well through the process of completion, before reaching the apex P, without relying on such wheels. It is contemplated that they shall be substantially similar in function to the wheels designated 23 and 24 in my copending application, Ser. No. 634,924, including (although no attempt has been made to illustrate it) internal water cooling means, quick release mounting means, and the like. As suggested in FIG. 2, each of the wheels 33, 34, as independently journaled by appropriate means, may be adjusted toward and away from the weld point P, for example through the agency of a mounting arm 35 appropriately pivoted at 36 at a fixed point and carrying the axle 37 of the wheel, permitting a swing to standby position.

With the completion of the welded joint, the resultant welded strip, specially designated S, passes through an opening 39 in the top of frame base 11, thence through a coolant bath in a suitable tank 27, under the guidance of a large diameter roller 40 suspended from the support. The continued further wrapping of welded strip S about roller 40 for a substantial distance enables the weld to cool and solidify before encountering a damaging amount of stress. After leaving the coolant bath, the strip S may be conventionally guided through stock leveler means, thence to accumulating tower means (neither shown), and the like to suitable rewind means.

In the alternative, the welded strip may be intermediately directed through Hall effect inspection equipment, in the manner illustrated and described in my application, Ser. No. 792,043.

FIGS. 2, 3, 3A, considered in conjunction with FIG. 1, illustrate structural features of the sliding contact-type resistance welding units 30, 31. They are essentially identical; accordingly the unit 30 will be specifically described, with corresponding features and relationships in the case of unit 31 being indicated by corresponding reference numerals, primed.

Unit 30 is electrically supplied by high frequency voltage means, including a power output transformer unit 41; this is shown in dot-dash line in FIG. 1, in view of the fact that it is, as indicated above, preferably located remotely from welding module 10. An electrically conductive bar or bracket 42, preferably of copper, is suitably supported fixedly in relation to the various roll means 18, 19, 24 and 25 on base 11, the corresponding bracket bar 42' for welder unit 31 being similarly supported and, as illustrated in FIG. 3, the brackets 42, 42' are rigidly secured together out of electrical contact with one another, as by bolt means 43 and an interposed insulating shim 44. They are appropriately connected electrically to the power source 41 in a manner obvious to one skilled in the art. Horizontally extending, mutually offset legs 45, 45' of the respective brackets have L-shaped copper conductor members 46, 46' bolted thereto, each of these conductors having its 90° extension in turn bolted in electrically conductive relation to the metallic body of a conductive electrode holder, such as a blocklike copper electrode body 47 of unit 30. The means for effecting the last-named bolted connection preferably comprises means enabling a selective proper angular relationship of the body 47 to the conductor 46.

As best shown in FIG. 2, the body 47 has a horizontal cylindrical bore 48 extending completely therethrough, within which an elongated cylindrical, electrically conductive electrode holder member 49 is mounted for axial sliding adjustment, being in electrically conductive engagement with the wall of bore 48. A friction pad 49 disposed in a side recess of bore 48 is urged under the slight pressure of a coil spring 50 into engagement with electrode holder member 49, thus to stabilize the action of the latter as it is urged continually in the direction toward large support roll 24 by means to be described.

Adjacent its outer end, right hand as viewed in FIG. 4, the holder 49 is recessed to provide a side seat receiving an elongated narrow copper electrode tip 52, this tip being fixedly but removably bolt clamped in place through the agency of a small clamp plate 53, hence readily and quickly replaced when worn.

A "Teflon" cylinder block 55 is fixedly secured, as by elongated bolts 56, to the end of electrode holder body 47 opposite the latter's tip 52, the body 55 being formed to provide a closed end cylinder bore 57 coaxial with, but of larger diameter than, the electrode body bore 48. Bore 57 slidably receives a pressure piston 58 equipped with an O-ring seal 59 acting against the bore wall; and piston 58 has a plunger extension 60 abutting against the end of slidable electrode holder 49. An appropriate inlet pressure nipple 61 is threaded into the closed end of cylinder 55, in fluidtight relation thereto, this fitting communicating with cylinder 57 and receiving a flexible rubber connector tube 62 leading to an appropriate source of constant pneumatic pressure (not shown). Accordingly, under such pressure the piston 58 biases cylindrical electrode holder member 49 and its replaceable electrode tip 52 into properly uniformly pressurized, sliding engagement with the strip A, as the latter advances in its arcuate engagement wrapped about roll 24.

Referring to FIG. 2, the mount for the electrode units 30, 31, is shown as being in the convergent weld zone Z, with heater tips 52, 52' bearing resiliently on the respective strips A, B at a location approximately 12° in advance of the weld apex point P, as the strips A and B travel into and through zone Z. This relationship obtains whether the heating is by sliding contact, resistive heating means, or by certain of the inductive means later described. The relationship enables the strip edges E to reach welding temperature just before the strip edges e are wiped past one another and become fused edge to edge and buttwise at the point P.

Referring to FIG. 4, the cylindrical electrode holder 49 is internally cooled by passing water from a suitable source through a flexible rubber tube 63 applied to a fitting 64 threaded into a port which communicates with one or more coolant circulating passages 65 formed within holder 49. A return fitting 66 communicates with such passage means, which is or are sealed at the end of holder 49 by threaded plug means. In order to accommodate motion of the fitting 63 as electrode holder 49 is continuously urged axially in a resilient fashion, the electrode holder body 47 is provided with an elongated slot 67 in a side thereof, through which slot the fitting 64 projects externally of the body. The fitting 66 is external of body 47 and receives a rubber coolant return flow tube 68.

Reference may now be made to FIGS. 11, 12 and 13 of the drawings for disclosure of an alternative high frequency resistive, sliding contact type of heating assembly, generally designated by the reference numeral 69, which presents certain advantages over the mounting arrangements for the electrode heater units 30, 30' described above.

Thus, the assembly 69 is shown as comprising a pair of generally similar copper conductive blocks 70, 71 having coaxial cylindrical bores 72, 73 of smaller and larger diameter, respectively, the blocks 70, 71 being electrically separated from one another by means of an interposed insulating shim 74. Suitable means (not shown) is provided to afford a fixed mount at a proper location for the conductor blocks 70, 71, just as the earlier described bodies 30, 31 are fixedly supported appropriately, and preferably adjustably.

An elongated cylindrical and electrically conductive supply rod 75, preferably of copper, extends with a sliding fit through bore 72 of block 70, but in electrically conducting engagement with the latter, thus enabling conductor rod 75 to turn about its axis in and in respect to the fixedly mounted block 70, without interrupting high frequency current flow. The fixedly mounted conductor blocks are electrically supplied appropriately from a high frequency source, such as the transformer unit 41 of FIG. 1, as by appropriate leads (not shown) applied to openings 77 in the blocks.

As depicted in FIG. 13, conductor rod 75 extends coaxially through an elongated insulating sleeve 78 in the zone of the second conductor block 71, which sleeve is surrounded by a second elongated copper conductor rod 79 of a tubular nature; and sleeve 79 has a sufficiently close sliding engagement with the bore 73 of block 71 to continually connect these members electrically to one another.

As best shown in FIGS. 11 and 12, the conductor rod 75 carries at its outer end a thin, elongated conducting electrode tip 80 which bears slidingly along the edge e of the strip A advancing in weld zone Z; while the tubular conductor rod 79 is similarly equipped with contact tip 81 bearing slidably adjacent the edge of the other strip B, both electrodes being located at a point in zone Z about 12° in advance of the weld apex, which is only schematically indicated as being at P in FIG. 11. It is of course intended that provision be made to removably and replaceably mount the tips 80, 81 to the respective rods 75 and 79.

For the purpose of maintaining uniform sliding contact of the electrode tips with the strip edges e, the conductor rod 75 has a crank 83 fixedly applied thereto at one side of electrode holder block 70; while the tubular conductor bar 79 carries a similar crank 84 at a side of block 71, in both cases preferably through the agency of electrical insulating means (not shown). The cranks 83 are clevis connected to and urged in opposite rotations (FIG. 11), by means of pressure rod means 85, such means being continuously operated under uniform pneumatic pressure in a manner similar to the piston and cylinder arrangement appearing in FIG. 4. Thus, the coaxial conductor means 75, 79 of the electrode assembly 69 are uniformly and resiliently biased rotatively about a common axis under an optimum force for proper electrode positioning; and they and/or their respective conductive mounting blocks 70, 71 may be liquid cooled in a simple way.

Being electrically supplied by appropriate remote transformer means, the electrode tips 80, 81, as in the earlier embodiment, are very accessible for obtaining and maintaining proper strip contact; and their engagement with the strips A and B under constant force compensates for wear. Other advantages of the embodiment of FIGS. 11–13, as applied in the heating of strips wrapped around large diameters, etc., are the same as described above in reference to the earlier form.

FIGS. 5–10, inclusive, illustrate alternative embodiments by which strip edge heating to welding temperature is accomplished by electrical induction. Thus, FIGS. 5 and 6 show one form, generally designated 87, in which a single turn coil 88, possibly best described as being in the form of a blunted arrow, is electrically supplied from a suitable source through leads 89. Inductive electrode 88 extends well into weld zone Z, and its nose at 90 is twisted somewhat in a mild, generally S-outline, as shown in FIG. 6, enabling it to span across the convergent strip edged e of strips A, B at a point approximately 12° forward of weld point P.

FIGS. 7 and 8 show an alternative heating arrangement 92, in which an electrode 88' shaped similarly to electrode 88 is supplemented by one or more additional connected turns 93, the portions 88' and 93 spanning the meeting zone of strips A and B in the fashion shown in FIG. 8. Electrical supply and return leads 89 and 94 connect respectively to coil turns 88' and 93.

A still further alternative embodiment 96 of the contemplated inductive heating means appears in FIGS. 9 and 10. Here, a pair of helix coils 97 and 98 are positioned coaxially of one another on opposite sides of the advancing strips A, B, and the welded strip product S, appropriate supply and return leads 99 and 100 of these respective coils being connected to an appropriate energizing source. Adjacent ends of the coils 97, 98 are connected by a conductive bight 101 extending across the convergent strip edges E.

For the purpose of intensifying and localizing the application of heat, small Ferrite rods 102, 103, which may be of cylindrical or other cross section, serve as fixed, aligned cores for the respective coils 97, 98, these rod cores being located in closely spaced transverse relation to strips A and B at the weld point P, as illustrated in FIG. 10. They concentrate the magnetic power into a very small area where maximum heating effect is desired. It is evident that each of the noncontacting embodiments of FIGS. 5–10 eliminates disadvantages of electrode wear, strip marking and arcing which may arise in a sliding contact type of heating.

What is claimed is:

1. A method of welding a pair of flat strips to one another along an intermediate seam, comprising advancing said strips convergently and flatwise through a weld zone, and also to a weld point at the apex of their convergence in said zone, in arcuate paths which are oppositely convex in relation to one another immediate said zone, both of said strips being stably and positively supported across the width thereof and over a relatively long arc of convex curvature in passing through the weld zone, whereby to impart substantially increased transverse column strength thereto, the paths being directed so as to bring said strips into substantially edgewise aligned and side-by-side contacting relation to one another in said weld zone, heating the strips to welding temperature during the advancing thereof in said zone, and completing the weld at said apical weld point.

2. The method of claim 1, in which the advancing strips are guided in a slightly overlapped relation to one another along adjacent edges thereof, the weld being completed by causing the overlapped edges to wipe past one another and into edge-abutting welded engagement in a common plane.

3. The method of claim 1, in which the strips are heated to welding temperature by sliding contact electrode means.

4. The method of claim 2, in which the strips are heated to welding temperature by sliding contact electrode means.

5. The method of claim 1, in which the strips are heated to welding temperature by electrically inductive means spaced from the strips.

6. The method of claim 2, in which the strips are heated to welding temperature by electrically inductive means spaced from the strips.

7. The method of claim 3, in which the electrode means is resiliently urged in sliding contact engagement with a strip.

8. The method of claim 7, in which the electrode means is resiliently urged in sliding contact engagement with a strip under uniform fluid pressure.

9. Equipment for welding a pair of advancing flat strips to one another along an intermediate seam, comprising means for guiding said strips flatwise into a weld zone in arcuate paths which are convergent and oppositely convex in relation to one another immediate said zone, said guide means supporting both of said strips stably and positively across the width thereof and over a relatively long arc of convex curvature in passing through the weld zone, whereby to impart substantially increased transverse column strength thereto, the paths being directed so as to bring said strips into substantially edgewise aligned and side-by-side contacting relation to one another in said weld zone, and means for heating the strips to welding temperature during the advancing thereof in said weld zone, the weld being completed adjacent the apex of conversion of the strips.

10. Equipment for edge-butt welding a pair of advancing flat strips to one another in a common plane along an intermediate seam, comprising means for guiding said strips flatwise in substantially opposite longitudinal directions into a weld zone in arcuate paths which are convergent and oppositely convex in relation to one another immediate said zone, said guide means supporting both of said strips stably and positively across the width thereof and over a relatively long arc of convex curvature in passing through the weld zone, whereby to impart substantially increased transverse column strength thereto, the paths being directed so as to bring said strips into substantially edgewise aligned and side-by-side contacting relation to one another, said means guiding the strips into a but slightly overlapped lateral relationship of adjacent edges thereof to one another, and means for heating adjacent edges of the strips to welding temperature during the advancing thereof in said weld zone, the weld being completed adjacent the apex of conversion of the strips, said guide means causing the overlapped adjacent strip edges to wipe past one another and into edge-butting welded engagement in said common plane.

11. The equipment of claim 9, in which said guide means further guides the advancing strips in a slightly overlapped relation to one another along adjacent edges thereof, causing the overlapped edges to wipe past one another and into edge-abutting welded engagement in a common plane.

12. Longitudinal strip welding equipment, comprising roller means about which a pair of flat strips are advanced flatwise in substantially opposite longitudinal directions into and through a weld zone, with the strips converging to an apex in said zone, said means comprising a guide roll and a curvature-imparting roll of relatively large diameter for each strip, about which rolls each strip is advanced successively in the order named, with the strips wrapped immediate said weld zone about the respective curvature-imparting rolls in traversing the weld zone, said curvature-imparting rolls supporting both of said strips stably and positively across the width thereof and over a relatively long arc of convex curvature in passing through the weld zone, whereby to impart substantially increased transverse column strength thereto, the last-named rolls being positioned relative to one another to bring adjacent edges of said strips, as thus curved in said arc, into substantially edge-wise aligned, side-by-side weld-completing engagement with one another adjacent the zone apex, and means heating said strips to welding temperature in traversing the weld zone.

13. The equipment of claim 12, and further comprising stop means acting positively on the adjacent edges of said strips prior to their wrapping about said curvature-imparting rolls, thus to maintain said edges in substantial longitudinal register.

14. The equipment of claim 12, and further comprising stop means acting positively on the adjacent edges of said strips prior to their wrapping about said curvature-imparting rolls, thus to maintain said edges in substantial longitudinal register, said stop means comprising an annular, radially extending flange on each of said guide rolls slidingly engaged by a strip edge.

15. The equipment of claim 9, in which said heating means comprises heating electrodes sliding engaging the strips, and elongated conductors of generally circular section arranged coaxially of one another and electrically connected to the respective electrodes to energize the latter.

16. The equipment of claim 10, in which said heating means comprises heating electrodes sliding engaging the strip edges, and elongated conductors of generally circular section arranged coaxially of one another and electrically connected to the respective electrodes to energize the latter.

17. Equipment in accordance with claim 12, in which said heating means comprises heating electrodes sliding engaging the strips, and elongated conductors of generally circular section arranged coaxially of one another and electrically connected to the respective electrodes to energize the latter.

18. Equipment in accordance with claim 12, in which said heating means comprises at least one inductive coil positioned in said weld zone sufficiently closely adjacent the strips to heat the latter to said welding temperature upon electrical energization of said coil.

19. The equipment of claim 9, in which said heating means comprises at least one inductive coil positioned in said weld zone sufficiently closely adjacent the edges of the strips to heat the latter to said welding temperature upon electrical energization of said coil.

20. The equipment of claim 10, in which said heating means comprises at least one inductive coil positioned in said weld zone sufficiently closely adjacent the edges of the strips to heat the latter to said welding temperature upon electrical energization of said coil.

21. The equipment of claim 19, in which there are plural coils so positioned, and core means associated with said at least one of said coils and disposed adjacent said apex to intensify the inductive heating.

22. The equipment of claim 20, in which there are plural coils so positioned, and core means associated with said at least one of said coils and disposed adjacent said apex to intensify the inductive heating.

23. The method of claim 1, in which said strips, in approaching and entering said weld zone, traverse said respective paths in substantially opposite longitudinal directions.

24. The method of claim 2, in which said strips, in approaching and entering said weld zone, traverse said respective paths in substantially opposite longitudinal directions.

25. The equipment of claim 9, in which said guide means causes said strips to travel in substantially opposite longitudinal directions in being wrapped about the respective curvature-imparting rolls.

* * * * *